(12) United States Patent
Sugimoto et al.

(10) Patent No.: US 10,106,199 B2
(45) Date of Patent: Oct. 23, 2018

(54) VEHICLE

(71) Applicant: TOYOTA JIDOSHA KABUSHIKI KAISHA, Toyota-shi (JP)

(72) Inventors: Sota Sugimoto, Toyota (JP); Norimasa Koreishi, Miyoshi (JP); Yasuhiko Fukuzumi, Nagoya (JP); Yasuhiro Hara, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 237 days.

(21) Appl. No.: 15/253,086

(22) Filed: Aug. 31, 2016

(65) Prior Publication Data

US 2017/0088186 A1 Mar. 30, 2017

(30) Foreign Application Priority Data

Sep. 24, 2015 (JP) ................................. 2015-187085

(51) Int. Cl.
  *B62D 25/08* (2006.01)
  *B62D 25/04* (2006.01)

(52) U.S. Cl.
  CPC ........... *B62D 25/087* (2013.01); *B62D 25/04* (2013.01)

(58) Field of Classification Search
  CPC ............................... B62D 25/087; B62D 25/08
  See application file for complete search history.

(56) References Cited

U.S. PATENT DOCUMENTS

| | | | | |
|---|---|---|---|---|
| 8,517,455 | B2 * | 8/2013 | Matsuura ............. | B62D 21/152 296/187.11 |
| 9,487,240 | B2 * | 11/2016 | Kisaku ................. | B62D 25/087 |
| 9,701,182 | B1 * | 7/2017 | Hallman ............. | B62D 21/157 |
| 2012/0153677 | A1 * | 6/2012 | Matsuura ............. | B62D 21/152 296/193.08 |
| 2015/0137559 | A1 * | 5/2015 | Lee ...................... | B62D 25/087 296/193.07 |
| 2015/0217809 | A1 | 8/2015 | Kisaku | |
| 2016/0297481 | A1 * | 10/2016 | Yokoi .................. | B62D 25/087 |

FOREIGN PATENT DOCUMENTS

| | | |
|---|---|---|
| JP | 2001-30951 | 2/2001 |
| JP | 2010-195296 A | 9/2010 |
| JP | 2014-46813 | 3/2014 |
| JP | 2016-175516 A | 10/2016 |
| WO | WO 2011/027638 A1 | 3/2011 |

* cited by examiner

*Primary Examiner* — Hilary L Gutman
(74) *Attorney, Agent, or Firm* — Oblon, McClelland, Maier & Neustadt, L.L.P.

(57) ABSTRACT

A vehicle includes a lower back panel, a rear side member, a gusset, a roof side rail, and a coupling member. The lower back panel has an outer panel and a lower back reinforcement, which is joined to the outer panel. The gusset is joined to both the lower back reinforcement and the rear side member. The coupling member is joined to both the rear end of the roof side rail and the lower back reinforcement. When viewed in the vehicle vertical direction, a region of the lower back reinforcement to which the gusset is joined overlaps with a region of the lower back reinforcement to which the coupling member is joined.

5 Claims, 9 Drawing Sheets

VEHICLE

BACKGROUND OF THE INVENTION

The present invention relates to a vehicle.

International Publication No. 2011/027638 discloses a vehicle having a lower back panel and a rear side member. The lower back panel is arranged in a rear section of the vehicle and extends in the lateral direction of the vehicle. The rear side member extends in the longitudinal direction of the vehicle. The rear side member has a rear end fixed to the lower back panel. A plate-shaped lower back reinforcement serving as a reinforcement member is fixed to the lower back panel. The lower back panel and the back reinforcement are each configured to have a hollow, closed cross section. This configuration increases the rigidity of the lower back panel. The vehicle has a roof side rail, which is located above the lower back panel and extends in the vehicle longitudinal direction. A roof is joined to the roof side panel. The roof side rail is coupled to the lower back panel through a coupling member. These components configure the framework of the vehicle.

When the vehicle runs, the rear side member is influenced by the road surface and vibrates in the vertical direction of the vehicle. Such vibration of the rear side member may be transmitted to the occupants as vibration of the vehicle and thus be a factor hampering improvement of riding comfort of the vehicle. The conventional vehicle has a gusset joined to the rear side member and the lower back reinforcement. The gusset increases the rigidity of the vehicle to restrain vibration of the rear side member. The effect of the gusset for restraining the vibration is, however, insufficient in certain aspects. There is thus a room for improvement.

SUMMARY OF THE INVENTION

Accordingly, it is an objective of the present invention to provide a vehicle that has improved rigidity and is capable of restraining vibration.

To achieve the foregoing objective and in accordance with one aspect of the present invention, a vehicle is provided that includes a lower back panel, a rear side member, a gusset, a roof side rail, and a coupling member. The lower back panel extends in a vehicle lateral direction and has an outer panel and a lower back reinforcement joined to the outer panel. The outer panel and the lower back reinforcement configure a closed cross section. The rear side member extends in a vehicle longitudinal direction and has a rear end fixed to the outer panel. The gusset is joined to both the lower back reinforcement and the rear side member. The roof side rail is located above the lower back panel and extends in the vehicle longitudinal direction, the roof side rail having a rear end. The coupling member is joined to both the rear end of the roof side rail and the lower back reinforcement to couple the roof side rail and the lower back reinforcement to each other. When viewed in the vehicle vertical direction, a region of the lower back reinforcement to which the gusset is joined overlaps with a region of the lower back reinforcement to which the coupling member is joined.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
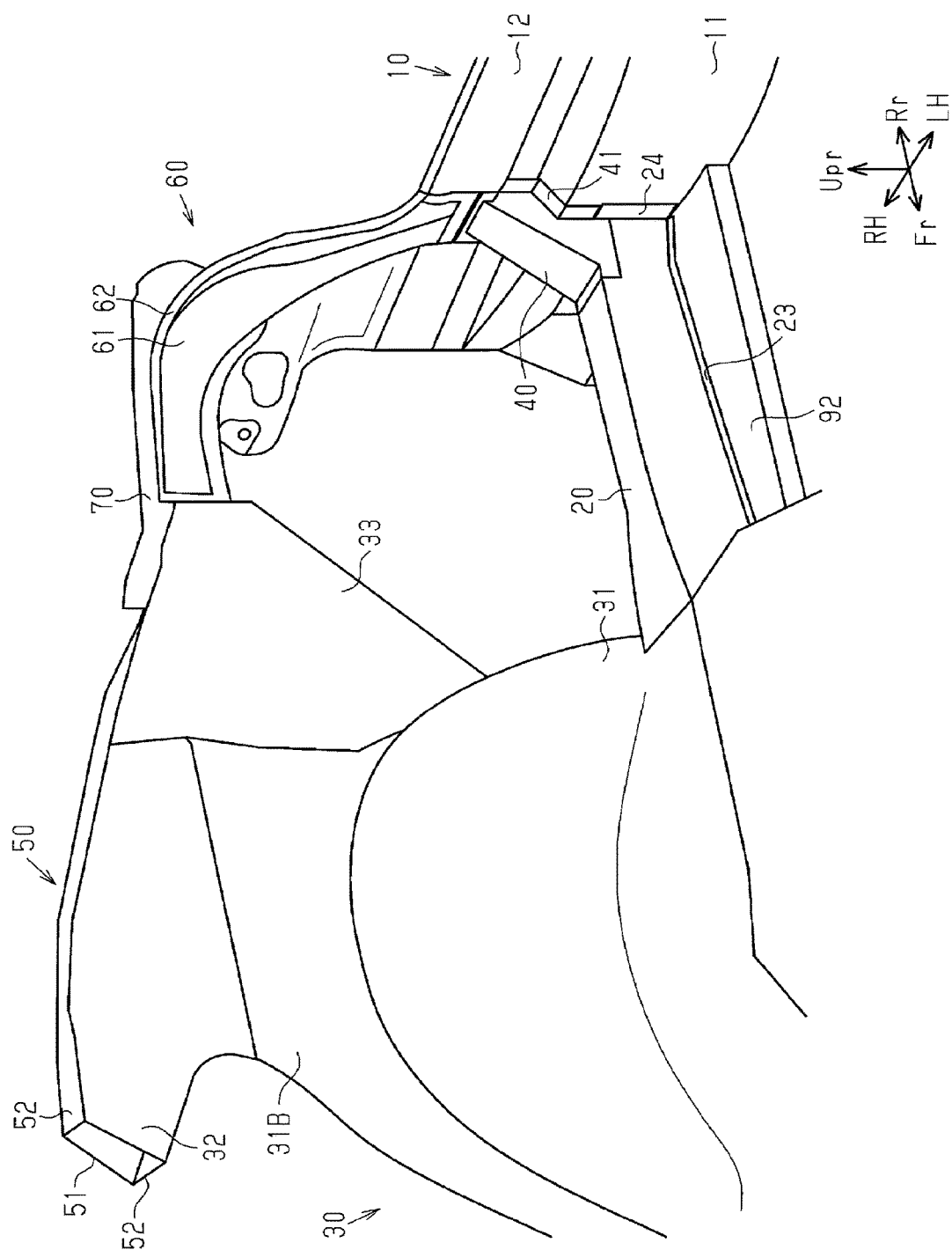
FIG. 1 is a perspective view showing the structure of the framework of a rear section of a vehicle.

A vehicle according to one embodiment will now be described with reference to FIGS. 1 to 9. In each of the drawings, the front side of the vehicle, the rear side of the vehicle, the right side in the vehicle lateral direction when facing forward of the vehicle, the left side in the vehicle lateral direction when facing forward of the vehicle, and the upper side of the vehicle are represented by signs "Fr, "Rr", "RH", "LH", and "Upr", respectively, as indicated by the directions of the corresponding arrows. The rear end of the vehicle is configured symmetrically by the section on the left side when facing forward of the vehicle and the section on the right side when facing forward of the vehicle. Accordingly, in the present embodiment, the configuration of the section on the right side when facing forward of the vehicle is described. Common reference numerals are given to the sections on the right and left sides when facing forward of the vehicle and description of the configuration of the section on the left side is omitted herein.

As shown in FIG. 1, a lower back panel 10, which extends in the vehicle lateral direction, is arranged in the rear end of a vehicle. An outer panel 11 and a lower back reinforcement 12, which is fixed to the front surface of the outer panel 11, is arranged in the lower back panel 10.

Figure 2:
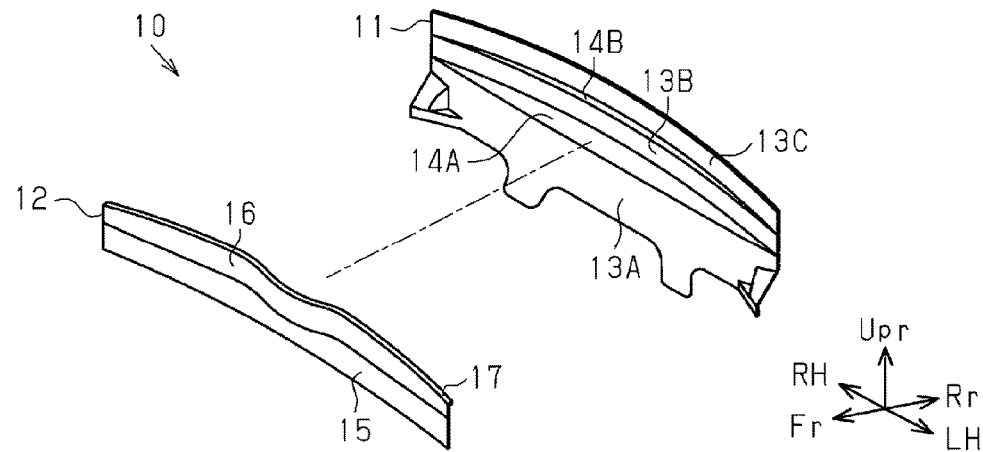
FIG. 2 is an exploded perspective view showing a lower back panel.

Referring to FIG. 2, the outer panel 11 is formed by bending a metal plate through pressing, for example, and has a first rear wall 13A, which is located at the lower end of the outer panel 11, and a first curved wall 14A, which extends from the upper end of the first rear wall 13A in a manner curved rearward. The first curved wall 14A is formed in an arcuate shape such that the closer to the center in the vehicle lateral direction, the more rearward the rear edge is located. A second rear wall 13B, which extends upward, is arranged along the rear edge of the first curved wall 14A. The second rear wall 13B is formed in an arcuate shape along the rear edge of the first curved wall 14A such that the closer to the center in the vehicle lateral direction, the more rearward the second rear wall 13B is located. A step formed by the first curved wall 14A is located between the first rear wall 13A and the second rear wall 13B. A second curved wall 14B, which extends in a manner curved rearward, is arranged at the upper edge of the second rear wall 13B. The second curved wall 14B is formed in an arcuate shape such that the closer to the center in the vehicle lateral direction, the more rearward the rear edge is located. A third rear wall 13C, which extends upward, is arranged along the rear edge of the second curved wall 14B. The third rear wall 13C is formed in an arcuate shape along the rear edge of the second curved wall 14B such that the closer to the center in the vehicle lateral direction, the more rearward the third rear wall 13C is located. A step formed by the second curved wall 14B is located between the second rear wall 13B and the third rear wall 13C.

The lower back reinforcement 12 is made of a metal plate, for example. The length in the vehicle lateral direction of the lower back reinforcement 12 is substantially equal to the length in the vehicle lateral direction of the outer panel 11. A fixed wall 15 is arranged at the lower end of the lower back reinforcement 12. The fixed wall 15 is shaped along the second rear wall 13B of the outer panel 11 and has a height substantially equal to the height of the second rear wall 13B. The upper end of the fixed wall 15 includes a bulging wall 16, which bulges such that the closer to the center to the center in the vehicle lateral direction, the more forward the bulging wall 16 is located. A contact wall 17, which extends rearward, is arranged at the upper end of the bulging wall 16. The lower back reinforcement 12 and the outer panel 11 are fixed together by holding the fixed wall 15 and the second rear wall 13B in contact with each other and holding the contact wall 17 in contact with the upper end of the third rear wall 13C and, in this state, welding the respective sections together, for example.

Figure 3:
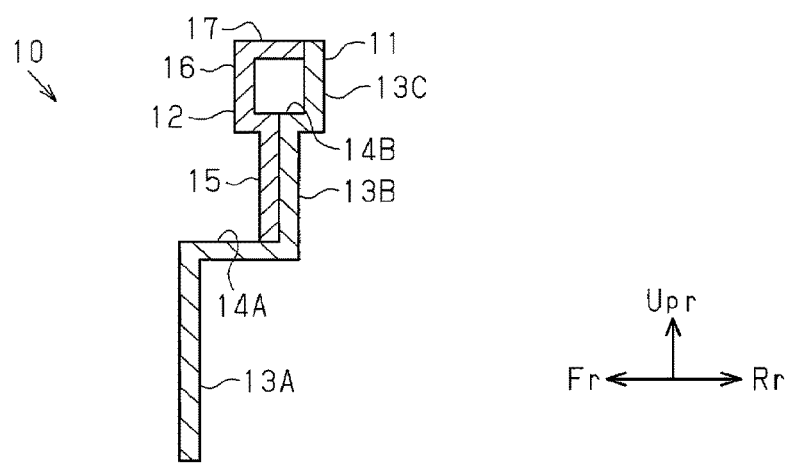
FIG. 3 is a cross-sectional view showing a part of the lower back panel.

As illustrated in FIG. 3, when the lower back reinforcement 12 is fixed to the outer panel 11, a space is formed between the bulging wall 16 of the lower back reinforcement 12 and the third rear wall 13C of the outer panel 11. That is, the outer panel 11 and the lower back reinforcement 12 form a hollow, closed cross section of the lower back panel 10.

Figure 4:
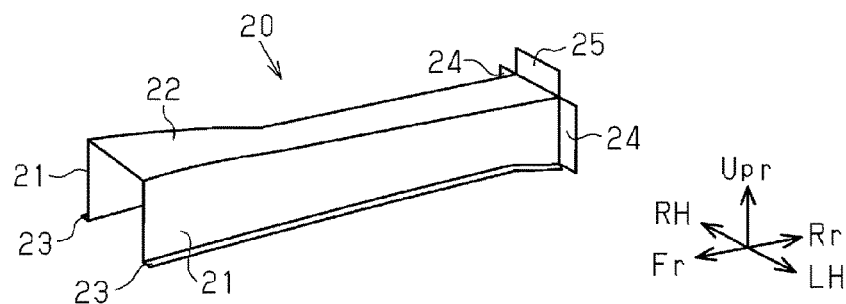
FIG. 4 is a perspective view showing a rear side member.

With reference to FIG. 1, a rear side member 20, which extends in the vehicle longitudinal direction, is fixed to the outer panel 11 of the lower back panel 10. The rear side member 20 is located below the lower back reinforcement 12. Referring to FIG. 4, the rear side member 20 has a substantially U-shaped cross section, which opens at the lower end. The rear side member 20 has a flat plate-shaped upper wall 22 and two side walls 21, which extend downward from opposite ends in the vehicle lateral direction of the upper wall 22 and are opposed to each other while being spaced apart by a predetermined distance in the vehicle lateral direction. Lateral extended portions 24, which extend from the side walls 21 to be spaced apart in the vehicle lateral direction, and a vertical extended portion 25, which extends upward from the upper wall 22, are arranged at the rear end of the rear side member 20. The extended portions 24, 25 are joined to the front surface of the outer panel 11 through, for example, welding. As shown in FIG. 1, a front end of the rear side member 20 is fixed to a wheel well 30, which accommodates a wheel of the vehicle. A flange 23, which extends outward from the lower end of each of the side walls 21 in the vehicle lateral direction, is arranged at the lower end of the side wall 21. Each of the flanges 23 is joined to the upper surface of a rear floor panel 92 through, for example, welding.

Figure 5:
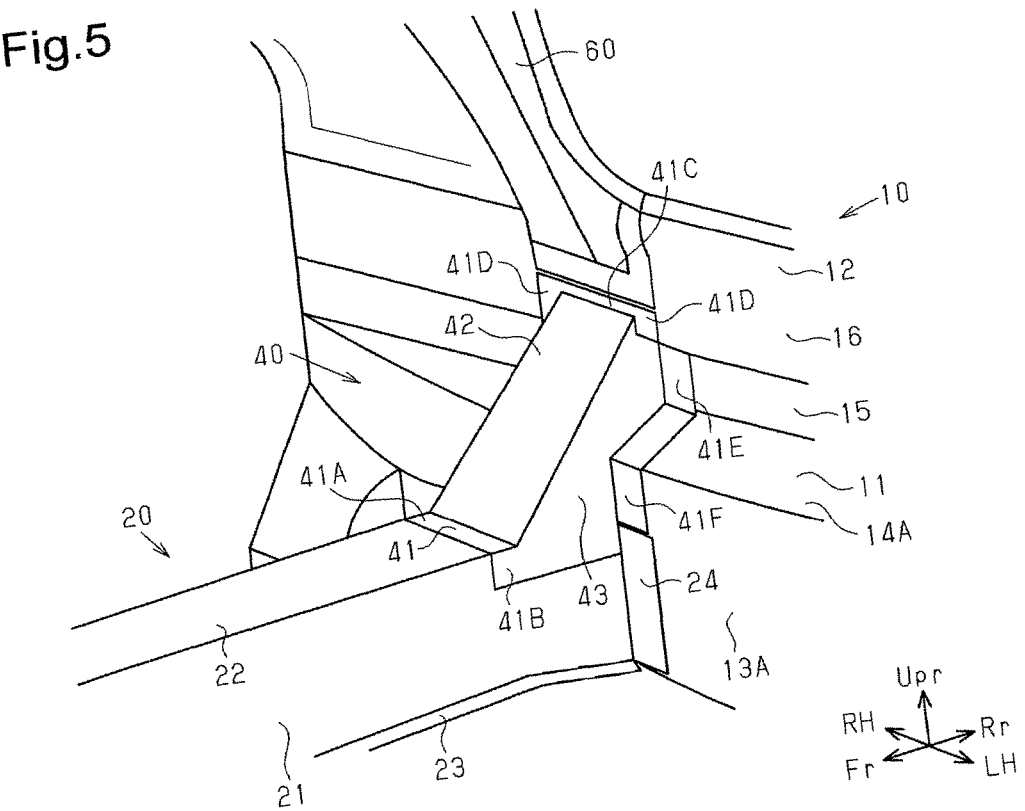
FIG. 5 is an enlarged perspective view showing a gusset.

As illustrated in FIG. 5, a gusset 40 is arranged in the rear end of the rear side member 20. The gusset 40 has an inclined wall 42, which extends upward, and two side walls 43, which are connected to the opposite ends in the vehicle lateral direction of the inclined wall 42. The gusset 40 is shaped to open at the lower end and in the rear end. A first flange portion 41A, which is in surface contact with the upper wall 22 of the rear side member 20, and a third flange portion 41C, which is in surface contact with the lower back reinforcement 12, are arranged in the inclined wall 42 of the gusset 40. A second flange portion 41B, which is in surface contact with the corresponding one of the side walls 21 of the rear side member 20, is arranged in each of the side walls 43. The first flange portion 41A and the second flange portions 41B are joined to the rear side member 20. A fourth flange portion 41D, which is inclined along the lower end of the bulging wall 16 of the lower back reinforcement 12 such that the lower side of the fourth flange portion 41D is located most rearward, is arranged in each of the opposite ends in the vehicle lateral direction of the third flange portion 41C. The third flange portion 41C and the fourth flange portions 41D are joined to the bulging wall 16 of the lower back reinforcement 12. A fifth flange portion 41E, which extends along the fixed wall 15 of the lower back reinforcement 12 and is joined to the fixed wall 15, is arranged at the lower end of each of the fourth flange portions 41D. A sixth flange portion 41F, which extends along the first curved wall 14A and the first rear wall 13A of the outer panel 11, is arranged at the lower end of each of the fifth flange portions 41E. The sixth flange portions 41F are joined to the outer panel 11. The first to sixth flange portions 41A to 41F form a single flange portion 41. In this manner, the gusset 40 is fixed to both the lower back panel 10 and the rear side member 20 by joining the flange portion 41 to the outer panel 11, the lower back reinforcement 12, and the rear side member 20.

Figure 6:
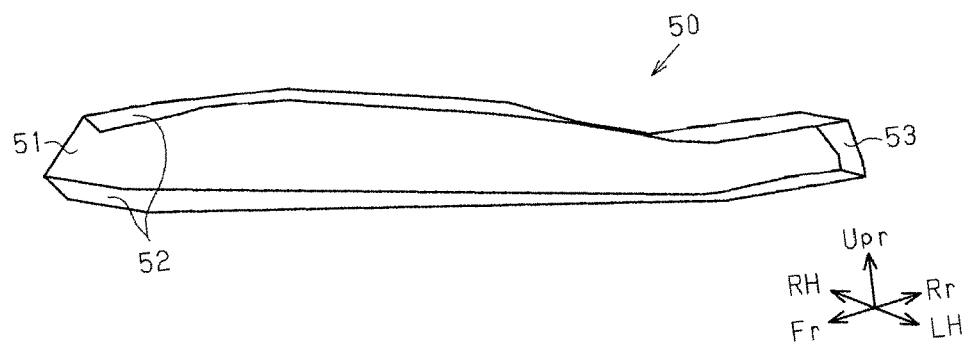
FIG. 6 is a perspective view showing a roof side rail.
Figure 7:
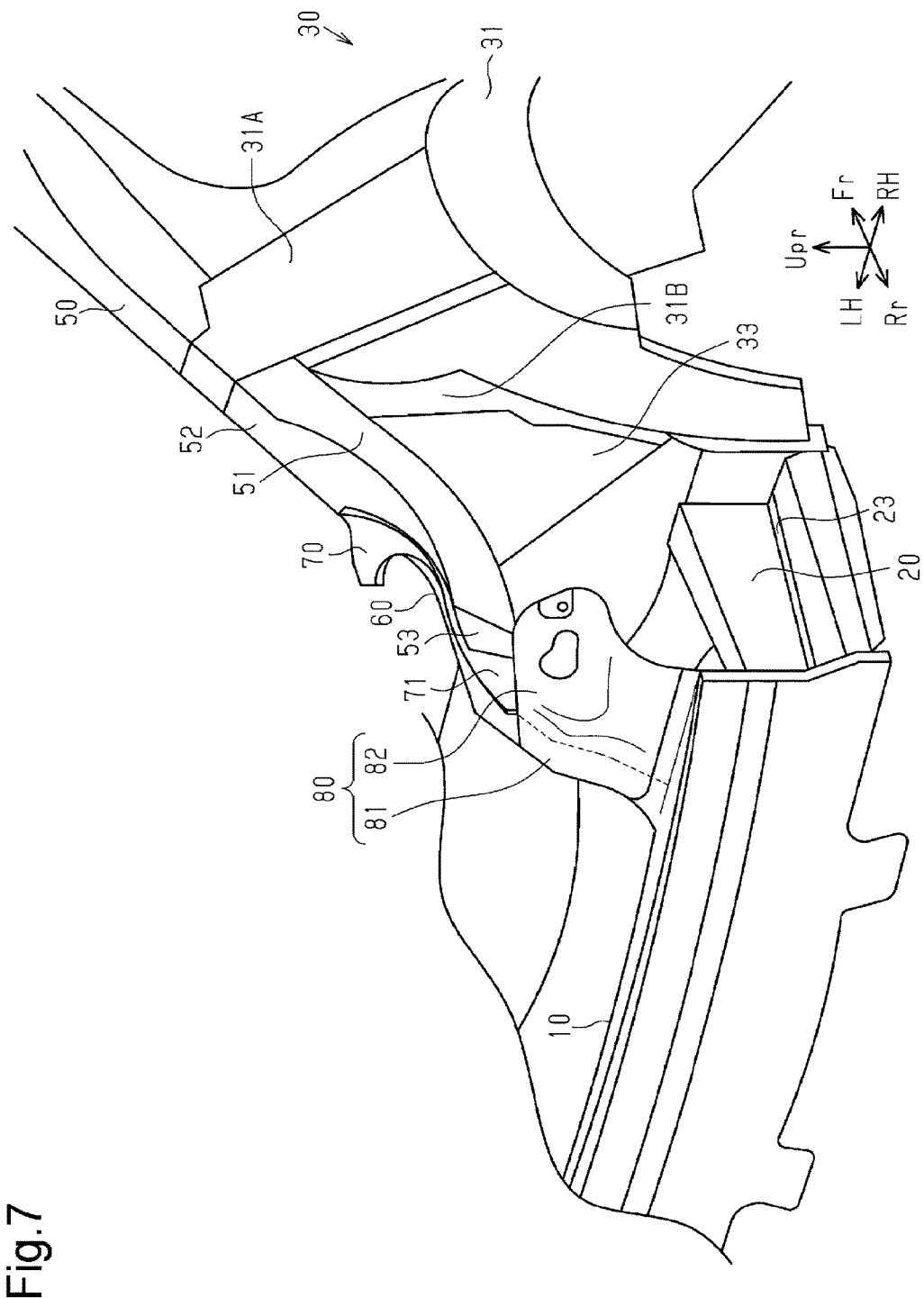
FIG. 7 is a perspective view showing the structure of the framework of the rear part of the vehicle as viewed at a different angle.

As illustrated in FIG. 1, the wheel well 30 includes a main body 31, to which the rear side member 20 is joined, a plate-shaped first panel 32 joined to an upper end of a side wall 31B of the main body 31, and a plate-shaped second panel 33 joined to a rear end of the side wall 31B of the main body 31. A roof side rail 50, which extends in the vehicle longitudinal direction, is joined to surfaces of the first panel 32 and the second panel 33 on the vehicle outer side. With reference to FIG. 6, the roof side rail 50 has an outer wall portion 51 and a pair of curved portions 52, which extend inward (leftward) in the vehicle lateral direction from the upper end and the lower end of the outer wall portion 51, and is shaped to open toward the vehicle inner side. A rear wall portion 53, which connects the curved portions 52 and the outer wall portion 51 together, is arranged in a rear end section of the roof side rail 50 at the vehicle rear side. Referring to FIG. 1, the front section of the roof side rail 50 is joined to the first panel 32. The section of the roof side rail 50 rearward of the section to which the first panel 32 is joined is joined to the second panel 33. The rear end of the roof side rail 50 extends further rearward than the second panel 33. By joining the roof side rail 50 to the panels 32, 33, the opening of the roof side rail 50 located at the vehicle inner side is closed. The roof side rail 50 has a closed cross section. Also, as illustrated in FIG. 7, a cover plate portion 31A, which extends to cover the roof side rail 50 from the outer side, is arranged in the main body 31 of the wheel well 30.

As illustrated in FIG. 1, a trough inner structure 60 is joined to the rear end of the roof side rail 50. An intervening member 70 is held between the trough inner structure 60 and the roof side rail 50. The intervening member 70 is arranged with its lower end held between the upper ends of the trough inner structure 60 and the roof side rail 50. The intervening member 70 projects upward from the trough inner structure 60 and the roof side rail 50.

The trough inner structure 60 extends in the vehicle longitudinal direction and is curved such that its rear end at the rear side is located downward. The rear end of the trough inner structure 60 is joined to the lower back reinforcement 12. The trough inner structure 60 has a substantially box-shaped inner wall portion 61, which is open at one side, and a flange wall 62, which is arranged at the peripheral edge of the opening of the inner wall portion 61. The front end of the trough inner structure 60, which is joined to the roof side rail 50, opens outward (rightward) in the vehicle lateral direction. The rear end of the trough inner structure 60, which is joined to the lower back reinforcement 12, opens rearward. That is, the opening is twisted from the front end toward the rear end to switch from a state facing outward in the vehicle lateral direction to a state facing the rear end of the vehicle.

The lower end of the section of the intervening member 70 held between the roof side rail 50 and the trough inner structure 60 does not extend sufficiently downward to close the openings of the roof side rail 50 and the trough inner structure 60. This allows the openings of the roof side rail 50 and the trough inner structure 60 to communicate with each other to form a closed cross section when the trough inner structure 60 and the roof side rail 50 are joined to each other.

As illustrated in FIG. 7, the intervening member 70 is held between the roof side rail 50 and the trough inner structure 60 in the vehicle lateral direction. In this state, a rear end 71 of the intervening member 70 is located rearward of the roof side rail 50. The rear end 71 extends downward to close the opening of the trough inner structure 60. The flange wall 62 of the trough inner structure 60 is joined to a surface of the rear end 71 on the vehicle inner side. Therefore, in this section, the intervening member 70 closes the opening of the trough inner structure 60 on the right side, thus forming a closed cross section. The rear end of the trough inner structure 60 extends further rearward than the intervening member 70. A lamp housing 80, which accommodates a lamp mounted in the vehicle, is joined to the rear end of the trough inner structure 60.

The lower end of the lamp housing 80 is joined to the lower back panel 10. The lamp housing 80 includes a closed wall 81 and an accommodating wall 82. The closed wall 81 is curved along the shape of the trough inner structure 60 and closes the opening of the trough inner structure 60. The accommodating wall 82 is arranged on the right side of the closed wall 81 and dented to accommodate the lamp.

When the closed wall 81 of the lamp housing 80 is joined to the rear end of the trough inner structure 60, the rear opening of the trough inner structure 60 is closed to form a closed cross section. That is, the trough inner structure 60, the intervening member 70, and the closed wall 81 of the lamp housing 80 configure a coupling member that couples the rear end of the roof side rail 50 and the lower back reinforcement 12 to each other. The cross section of the coupling member is closed from a front end to a rear end.

Figure 8:
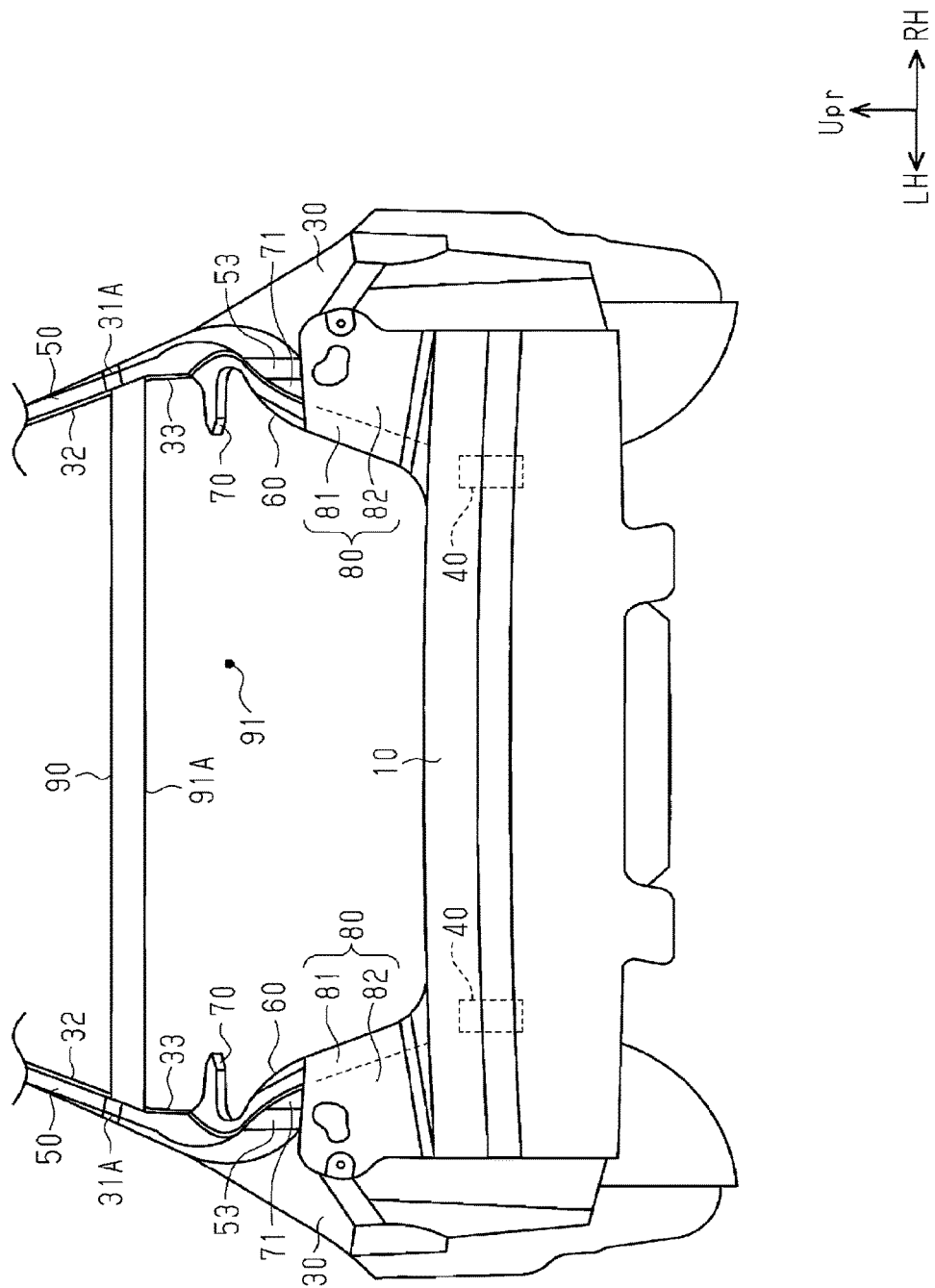
FIG. 8 is a front view showing a rear end of the vehicle.

With reference to FIG. 8, the vehicle has a cross member 90, which extends in the vehicle lateral direction to connect the roof side rails 50 to each other. An accommodating chamber 91 having an opening 91A, which allows for communication between the interior and the exterior of the vehicle, is arranged in the rear section of the vehicle. The front framework of the opening 91A is configured by the cross member 90. The rear framework of the opening 91A is configured by the lower back panel 10. The left and right frameworks of the opening 91A are configured by the roof side rail 50, the second panel 33, the trough inner structure 60, the intervening member 70, and the lamp housing 80. That is, a coupling member configured by the trough inner structure 60, the intervening member 70, and the lamp housing 80 configures a part of the opening 91A of the accommodating chamber 91. The rear end of the trough inner structure 60 and the closed wall 81 of the lamp housing 80 are curved inward in the vehicle lateral direction when viewed in the vehicle longitudinal direction. This allows for arrangement of the rear end of the trough inner structure 60 and the gusset 40 at the same position in the vehicle lateral direction.

Figure 9:
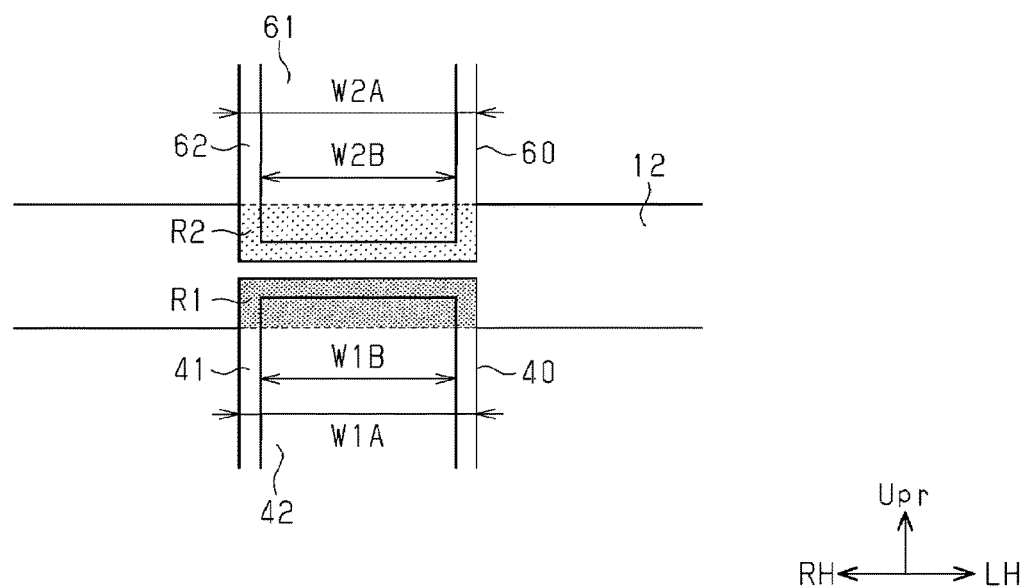
FIG. 9 is a front view showing a region of the lower back reinforcement to which the gusset is joined and a region of the lower back reinforcement to which a trough inner structure is joined.

As illustrated in FIG. 9, the gusset 40 and the trough inner structure 60 are joined to the lower back reinforcement 12. In FIG. 9, the region of the lower back reinforcement 12 to which the gusset 40 is joined is represented as region R1 and the region of the lower back reinforcement 12 to which the trough inner structure 60 is joined is represented as region R2. The length of the region R1 in the vehicle lateral direction, which is the length W1A of the gusset 40 as a whole including the inclined wall 42 and the flange portion 41 in the vehicle lateral direction, is substantially equal to the length of the region R2 in the vehicle lateral direction, which is the length W2A of the trough inner structure 60 as a whole including the inner wall portion 61 and the flange wall 62 in the vehicle lateral direction. Also, the length W1B of the inclined wall 42 of the gusset 40 in the vehicle lateral direction is substantially equal to the length W2B of the inner wall portion 61 of the trough inner structure 60 in the vehicle lateral direction. The positions of the opposite ends in the vehicle lateral direction of the region R1 are determined depending on the positions of the opposite ends of the gusset 40 as a whole in the vehicle lateral direction. The positions of the opposite ends in the vehicle lateral direction of the region R2 are determined depending on the positions of the opposite ends in the vehicle lateral direction of the trough inner structure 60 as a whole. The two ends in the vehicle lateral direction of the gusset 40 are located at the same positions as the two ends in the vehicle lateral direction of the trough inner structure 60. Therefore, when viewed in the vehicle vertical direction, the two ends in the vehicle lateral direction of the region R1 are located at the same positions as the positions of the two ends in the vehicle lateral direction of the region R2 and the regions R1 and R2 fully overlap with each other in the vehicle lateral direction. In the present embodiment, the two opposite ends in the vehicle lateral direction of the inclined wall 42 of the gusset 40 and the two opposite ends in the vehicle lateral direction of the inner wall portion 61 of the trough inner structure 60 are located at the same positions in the vehicle lateral direction. The term "same" herein does not necessarily refer to an exact match but may tolerate variations caused by manufacturing or assembly tolerances in respective components.

The advantages of the present embodiment will hereafter be described.

(1) In the present embodiment, the region R1 overlaps with the region R2 when viewed in the vehicle vertical direction. As a result, when load acts in the vehicle vertical direction, the gusset 40 and the trough inner structure 60, which are arranged in the direction in which the load acts, support each other, or, in other words, the rear side member 20, to which the gusset 40 is joined, and the roof side rail 50, to which the trough inner structure 60 is joined, support each other, thus receiving the load in a desirable manner. Particularly, in the present embodiment, the two opposite ends in the vehicle lateral direction of the region R1 are located at the same positions as the two opposite ends in the vehicle lateral direction of the region R2, when viewed in the vehicle vertical direction. This allows for full transmission of vibration caused in the rear side member 20 and the gusset 40 in the vertical direction to the trough inner structure 60. Also, vibration caused in the roof side rail 50 and the trough inner structure 60 in the vertical direction is fully transmitted to the gusset 40 in the vertical direction. Vibration in the vehicle vertical direction is thus restrained in a desirable manner in both the gusset 40 and the trough inner structure 60. The joint structures of the gusset 40 and the trough inner structure 60 with respect to the lower back reinforcement 12 increase rigidity of the vehicle, thus restraining vibration of the rear side member 20.

(2) The roof side rail 50, the intervening member 70, and the closed wall 81 of the lamp housing 80 are joined to the trough inner structure 60. The coupling member formed by these components has a closed cross section. This increases the rigidity of the coupling member and restrains vibration caused in the coupling member, compared to a case in which the coupling member has an open cross section.

(3) A part of the opening 91A of the accommodating chamber 91 that is arranged in the rear section of the vehicle is configured by the coupling member. Vibration caused in the opening 91A is thus transmitted to the gusset 40 and the rear side member 20 in the vehicle vertical direction to restrain such vibration. Also, since a part of the coupling member functions as a framework member configuring the opening 91A of the accommodating chamber 91, the number of components is reduced. The coupling member has a closed cross section. Rigidity of the opening 91A of the accommodating chamber 91 is increased. It is thus unnecessary to arrange a separate reinforcement member for increasing the rigidity of the opening 91A in the accommodating chamber 91. As a result, the accommodating space in the accommodating chamber 91 is increased in volume.

The above illustrated embodiment may be modified as follows. The following modifications may be combined as necessary.

The joint structures of the gusset 40 and the trough inner structure 60 are not restricted to the above-described structures. For example, configurations shown in FIGS. 10 and 11 may be employed.

Figure 10:
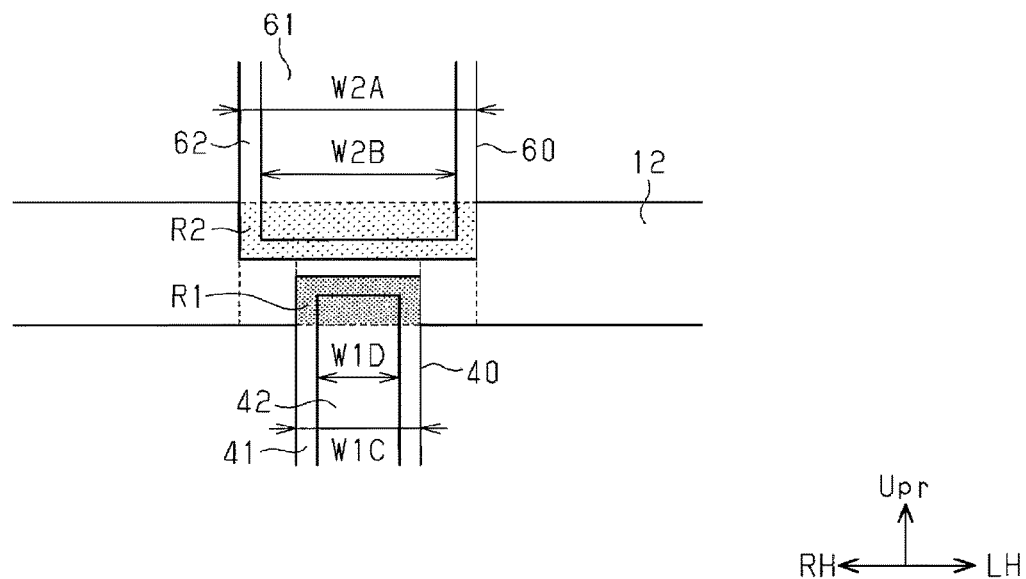
FIG. 10 is a front view showing a region of a lower back reinforcement to which a gusset is joined and a region of the lower back reinforcement to which a trough inner structure is joined according to a modification.

As illustrated in FIG. 10, the shapes of the gusset 40 and the trough inner structure 60 on the rear side may be set such that, in the lower back reinforcement 12, the opposite ends in the vehicle lateral direction of the region R1, to which the gusset 40 is joined, are located between the opposite ends in the vehicle lateral direction of the region R2, to which the trough inner structure 60 is joined, when viewed in the vehicle vertical direction. That is, the length W1D in the vehicle lateral direction of the inclined wall 42 of the gusset 40 is set smaller than the length W2B in the vehicle lateral direction of the inner wall portion 61 of the trough inner structure 60 (W1D<W2D). In this manner, the length W1C in the vehicle lateral direction of the gusset 40 as a whole including the flange portion 41 becomes smaller than the aforementioned length W2A of the trough inner structure 60 (W1C<W2A). Further, the gusset 40 and the trough inner structure 60 are arranged such that the upper end of the gusset 40, throughout the whole region from one end to the other in the vehicle lateral direction, is opposed to the lower end of the trough inner structure 60. In this configuration, the region R2 is located immediately above the entire portion of the region R1 and the regions R1 and R2 overlap with each other when viewed in the vehicle vertical direction. Vibration caused in the rear side member 20 and the gusset 40 in the vertical direction is thus fully transmitted to the trough inner structure 60 in the vertical direction, thus restraining vibration of the rear side member 20. As a result, this configuration also increases the rigidity of the vehicle and restrains vibration of the rear side member 20.

Figure 11:
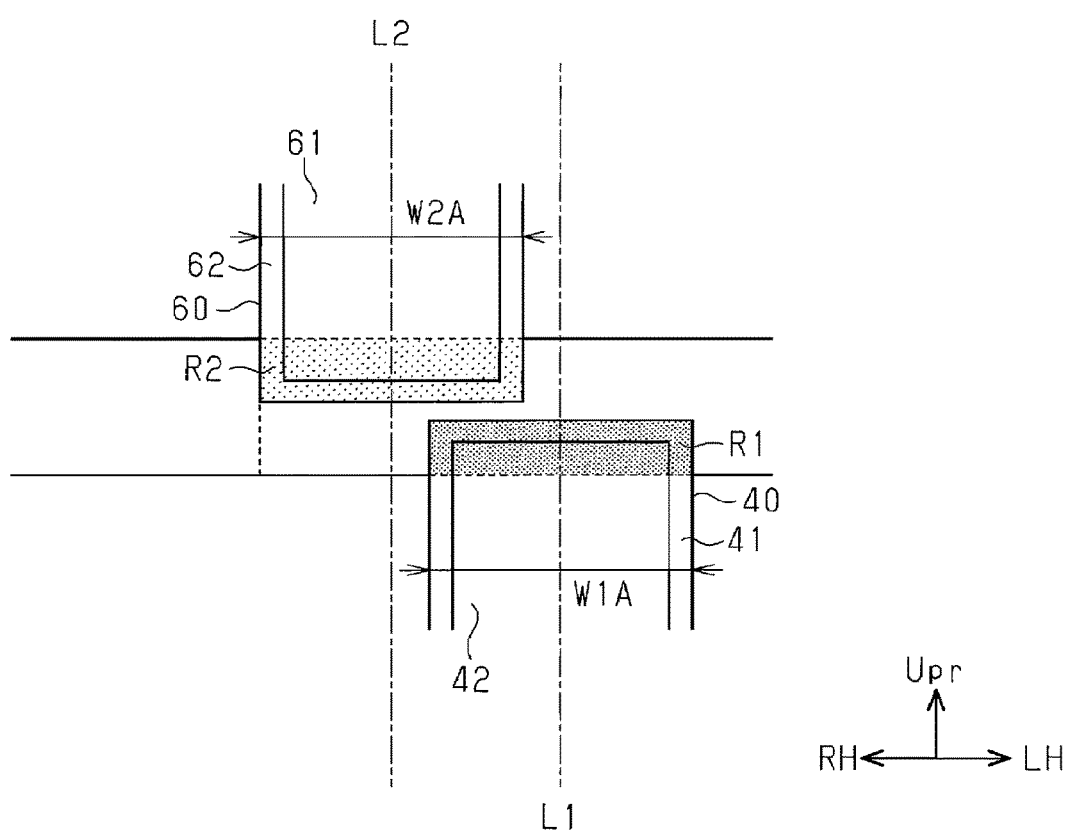
FIG. 11 is a front view showing a region of a lower back reinforcement to which a gusset is joined and a region of the lower back reinforcement to which a trough inner structure is joined in according to a modification.

Also, with reference to FIG. 11, the locations of the gusset 40 and the trough inner structure 60 may be set such that, in the lower back reinforcement 12, the region R1, to which the gusset 40 is joined, and the region R2, to which the trough inner structure 60 is joined, partially overlap with each other, when viewed in the vehicle vertical direction. That is, the gusset 40 and the trough inner structure 60 are joined to the lower back reinforcement 12 with the center line L1 in the vehicle lateral direction of the gusset 40 and the center line L2 in the vehicle lateral direction of the trough inner structure 60 located offset from each other. One end in the vehicle lateral direction of the gusset 40 and the trough inner structure 60 is arranged between the opposite ends in the vehicle lateral direction of the other end of the gusset 40 and the trough inner structure 60. Also in this configuration, the aforementioned regions R1 and R2 partially overlap with each other when viewed in the vehicle vertical direction. As a result, when load acts in the vehicle vertical direction, the gusset 40 and the trough inner structure 60, which are arranged in the direction in which the load acts, support each other to receive the load in a desirable manner. This configuration thus also increases the rigidity of the vehicle and restrains vibration of the rear side member 20. Further, referring to FIG. 11, in the configuration in which the center line L2 is offset outward (leftward as viewed in the drawing) in the vehicle lateral direction from the center line L1, the opening 91A of the accommodating chamber 91 is increased in size.

In each of the above-described configurations, at least one of the length in the vehicle lateral direction of the inclined wall 42 of the gusset 40 and the length in the vehicle lateral direction of the flange portion 41 may be set to any value as needed. Also, at least one of the length in the vehicle lateral direction of the inner wall portion 61 of the trough inner structure 60 and the length in the vehicle lateral direction of the flange wall 62 may be set to any value as needed. For example, by adjusting lengths of respective sections, the aforementioned length W1A of the gusset 40 may be set greater than the aforementioned length W2A of the trough inner structure 60.

Figure 12:
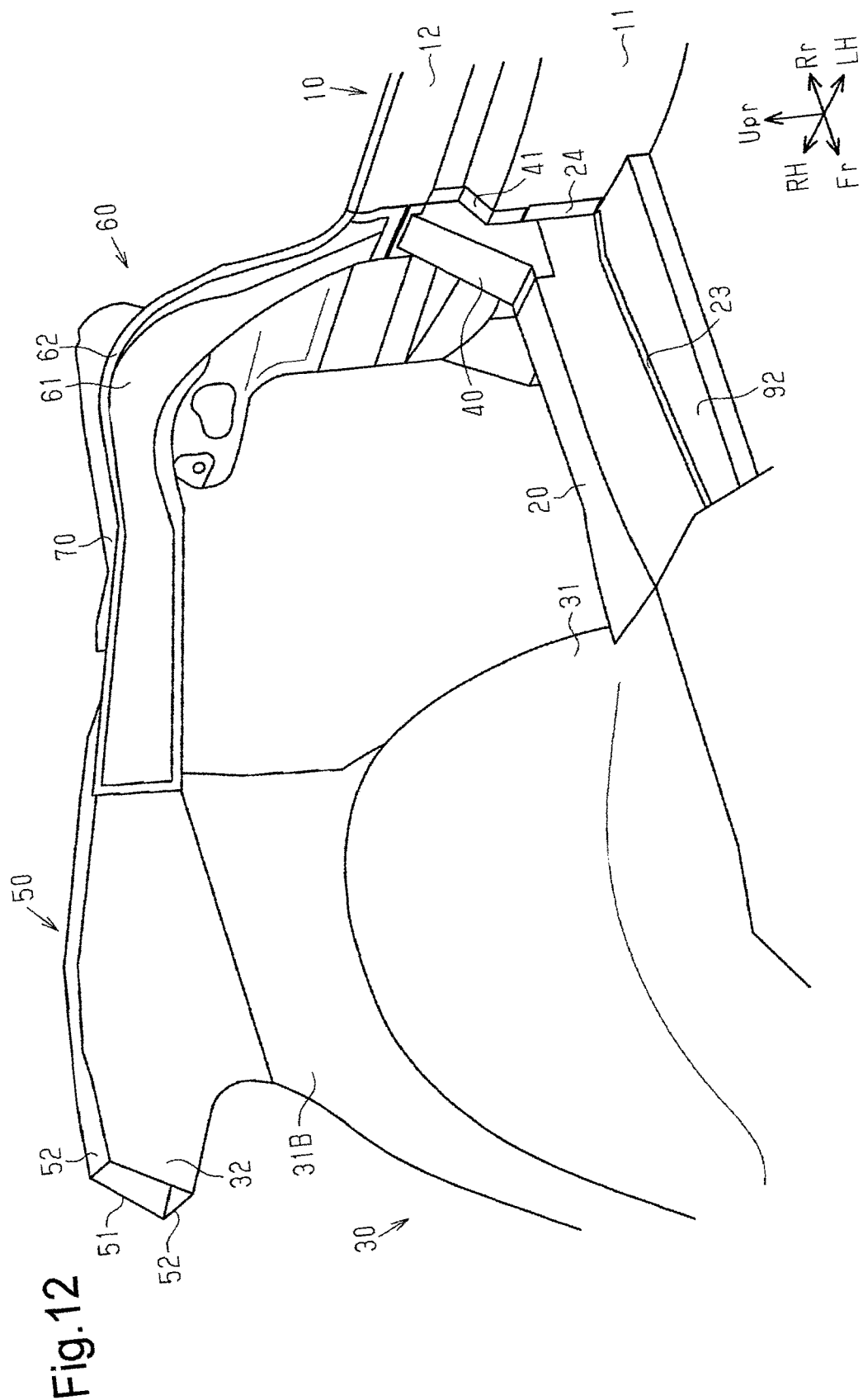
FIG. 12 is a perspective view showing the configuration of a trough inner structure according to a modification.

The configuration of the wheel well 30 is not restricted to the above-described configuration. For example, referring to FIG. 12, the second panel 33 may be omitted. In this case, the front end of the trough inner structure 60 is extended to the rear end of the first panel 32 to join the trough inner structure 60 to the roof side rail 50. In this manner, the opening of the roof side rail 50 at the inner side in the vehicle lateral direction is closed to form a closed cross section structure. Alternatively, the first panel 32 may be extended toward the vehicle rear side to close the opening of the roof side rail 50, thus forming a closed cross section structure. Further, the opening of the roof side rail 50 may be maintained open in the section from which the second panel 33 is omitted, without extending the first panel 32 or the trough inner structure 60 in the vehicle longitudinal direction, such that the aforementioned section has an open cross section. Alternatively, the first panel 32 may be omitted while the second panel 33 is saved, or both the first panel 32 and the second panel 33 may be omitted. In these cases, in which the panels 32, 33 are omitted, it is desirable to form the roof side rail 50 in a tubular shape to form a closed cross section solely by the roof side rail 50, in order to ensure the rigidity of the roof side rail 50.

The configuration of the gusset 40 is not restricted to the illustrated configuration. For example, the configuration shown in FIG. 13 may be employed.

Figure 13:
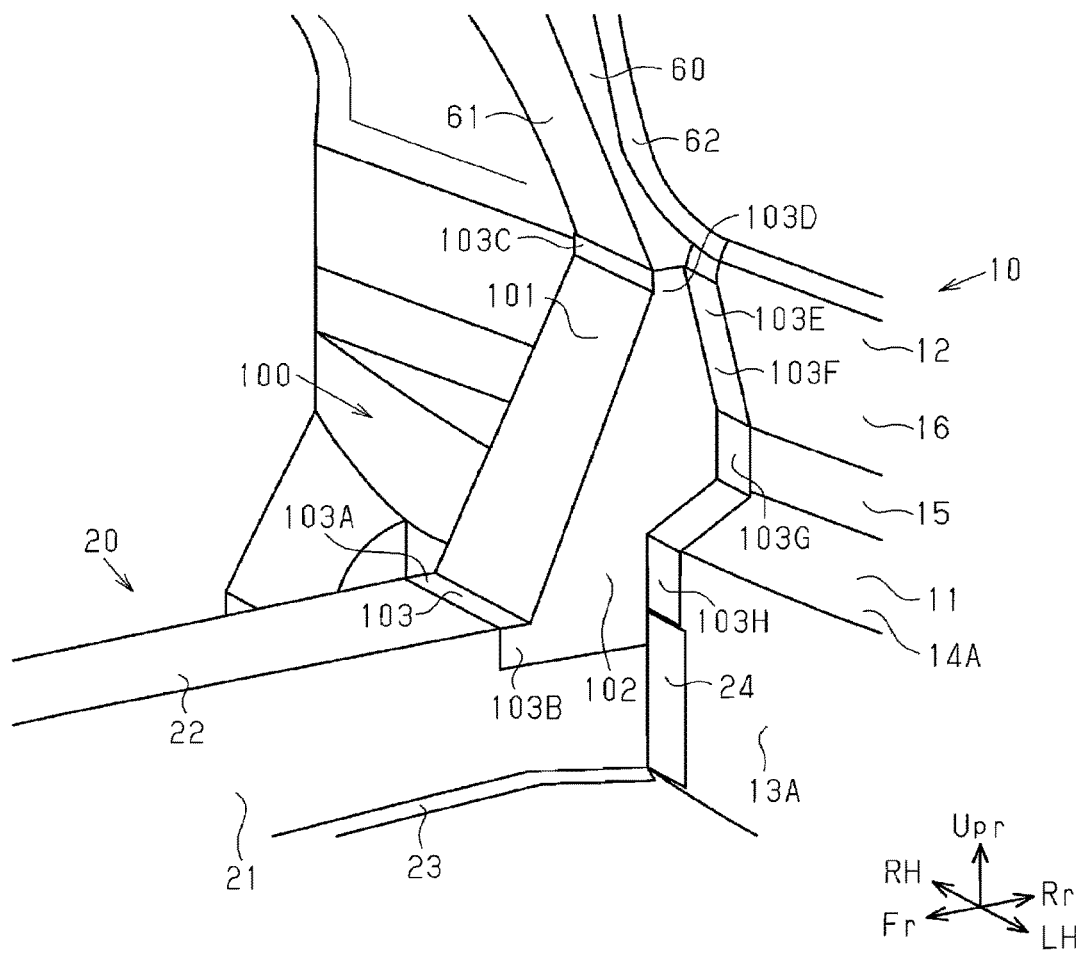
FIG. 13 is a perspective view showing the configuration of a gusset according to a modification.

As illustrated in FIG. 13, a gusset 100 has an inclined wall 101 and two side walls 102, which are connected to opposite ends in the vehicle lateral direction of the inclined wall 101. The gusset 100 is shaped to open at the lower end and a rear end of the gusset 100.

The inclined wall 101 of the gusset 100 has a first flange portion 103A, which is in surface contact with the upper wall 22 of the rear side member 20, and a third flange portion 103C, which is in surface contact with an outer surface of the inner wall portion 61 of the trough inner structure 60. Each of the side walls 102 has a second flange portion 103B, which is in surface contact with the corresponding one of the side walls 21 of the rear side member 20. The first flange portion 103A and the second flange portion 103B are joined to the rear side member 20.

A fourth flange portion 103D, which extends along a side surface of the inner wall portion 61 of the trough inner structure 60, is arranged at each of the opposite ends in the vehicle lateral direction of the third flange portion 103C. A fifth flange portion 103E, which overlaps with the flange wall 62 of the trough inner structure 60, is arranged in each of the fourth flange portions 103D. The third flange portion 103C, the fourth flange portions 103D, and the fifth flange portions 103E are joined to the trough inner structure 60. A sixth flange portion 103F, which extends downward along the bulging wall 16 of the lower back reinforcement 12 and is joined to the bulging wall 16, is arranged at the lower end of each of the fifth flange portions 103E. A seventh flange portion 103G, which extends along the fixed wall 15 of the lower back reinforcement 12 and is joined to the fixed wall 15, is arranged at the lower end of each of the sixth flange portions 103F. An eighth flange portion 103H, which extends along the first curved wall 14A and the first rear wall 13A of the outer panel 11, is arranged at the lower end of each of the seventh flange portions 103G. The eight flange portions 103H are joined to the outer panel 11.

The first to eighth flange portions 103A to 103H form a single flange portion 103. As has been described, the flange portion 103 of the gusset 100 is joined to the outer panel 11, the lower back reinforcement 12, the rear side member 20, and the trough inner structure 60.

In this configuration, the gusset 100 is fixed to both the lower back panel 10 and the rear side member 20. Also, an upper end of the gusset 100 joined to the lower back reinforcement 12 and a lower end of the trough inner structure 60 joined to the lower back reinforcement 12 are joined to each other.

By joining the gusset 100 and the trough inner structure 60 to each other, vibration caused in both the gusset 100 and the trough inner structure 60 is transmitted directly from one to the other. This simplifies the vibration transmitting structure, thus restraining such vibration directly. Also, a configuration in which the rear side member 20 and the roof side rail 50 are arranged linearly is brought about, which contributes to improvement of rigidity of the vehicle.

A certain or every section of the coupling member may have an open cross section.

The configuration of the coupling member is not restricted to the above-described configuration. For example, the intervening member 70 or the closed wall 81 may be omitted. Alternatively, a component other than the intervening member 70, the closed wall 81, and the trough inner structure 60 may be used as the coupling member. For example, a tubular member formed in a tubular shape may be employed as the coupling member.

The upper end of the flange portion 41 of the gusset 40 and the lower end of the flange wall 62 of the trough inner structure 60 may contact each other. Alternatively, one of the flange portion 41 and the flange wall 62 may overlap with the other.

The trough inner structure 60 may be extended downward to cover the upper end of the gusset 40 joined to the lower back reinforcement 12 by means of the lower end of the trough inner structure 60 joined to the lower back reinforcement 12.

The flange portion 41, 103 of the gusset 40, 100 may be omitted, or the flange wall 62 of the trough inner structure 60 may be omitted. Alternatively, the flange 23 or the extended portions 24, 25 of the rear side member 20 may be omitted.

The manner in which the outer panel 11 and the lower back reinforcement 12 of the lower back panel 10 are fixed to each other may be changed as needed. For example, the lower back reinforcement 12 may be fixed to the front surface of the first rear wall 13A of the outer panel 11. Alternatively, a plurality of lower back reinforcements 12 may be fixed to the outer panel 11. In this case, the rear side member 20 may be joined to not only the outer panel 11 but also a lower back reinforcement 12, which is located at a lower position in the vehicle vertical direction.

Although the front framework of the opening 91A of the accommodating chamber 91 is configured by the cross member 90, the present invention is not restricted to this. For example, the rear end of the ceiling panel of the vehicle may configure the front framework of the opening 91A of the accommodating chamber 91.

Therefore, the present examples and embodiments are to be considered as illustrative and not restrictive and the invention is not to be limited to the details given herein, but may be modified within the scope and equivalence of the appended claims.

The invention claimed is:

1. A vehicle comprising:
a lower back panel extending in a vehicle lateral direction, the lower back panel having an outer panel and a lower back reinforcement joined to the outer panel, and the outer panel and the lower back reinforcement configuring a closed cross section;
a rear side member extending in a vehicle longitudinal direction, wherein a rear end of the rear side member is fixed to the outer panel of the lower back panel;
a gusset joined to both the lower back reinforcement and the rear side member;
a roof side rail located above the lower back panel and extending in the vehicle longitudinal direction; and
a coupling member joined to both a rear end of the roof side rail and the lower back reinforcement to couple the roof side rail and the lower back reinforcement to each other,
wherein, when viewed in the vehicle vertical direction, a region of the lower back reinforcement to which the coupling member is joined is included in a region of the lower back reinforcement to which the gusset is joined.

2. The vehicle according to claim 1, wherein, when viewed in the vehicle vertical direction, opposite ends in the vehicle lateral direction of the region of the lower back reinforcement to which the gusset is joined are located at the same positions as opposite ends in the vehicle lateral direction of the region of the lower back reinforcement to which the coupling member is joined.

3. The vehicle according to claim 1, wherein an end of the gusset joined to the lower back reinforcement and an end of the coupling member joined to the lower back reinforcement are joined to each other.

4. The vehicle according to claim 1, wherein
an accommodating chamber having an opening allowing for communication between an interior and an exterior of the vehicle is arranged in a rear section of the vehicle, and
at least a part of the opening is configured by the coupling member.

5. The vehicle according to claim 1, wherein the coupling member has a closed cross section.

* * * * *